June 13, 1944.  S. SCHNELL  2,351,153
BRAKING SYSTEM
Filed Sept. 30, 1942
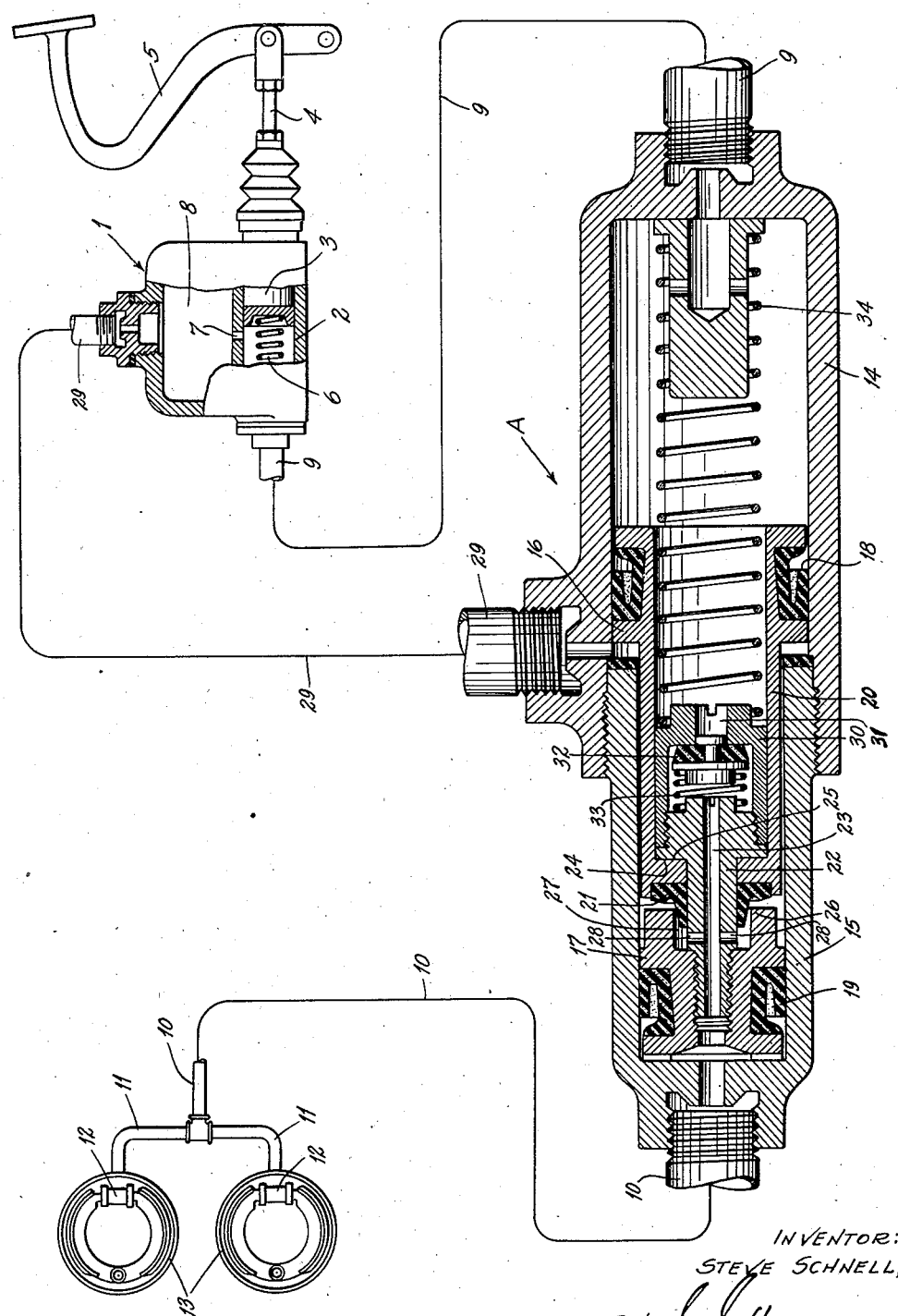
INVENTOR:
STEVE SCHNELL,
BY
ATTORNEY.

Patented June 13, 1944

2,351,153

UNITED STATES PATENT OFFICE 2,351,153

BRAKING SYSTEM

Steve Schnell, Kirkwood, Mo., assignor to Wagner Electric Corporation, St. Louis, Mo., a corporation of Delaware Application September 30, 1942, Serial No. 460,208

11 Claims. (Cl. 60—54.5)

My invention relates to actuating systems and more particularly to an improved fluid pressure actuating system suitable for brakes or like apparatus.

One of the objects of my invention is to produce an improved hydraulic brake actuating system in which the actuated device such as a brake can be held applied with a predetermined pressure by an actuating force smaller than that necessary to apply the predetermined pressure.

Another object of my invention is to provide a hydraulic brake actuating system with a pressure control valve means that will permit the decreasing of a braking pressure and then the subsequent re-establishment of said pressure by employing a smaller actuating force than that required to originally obtain the braking pressure.

A more general object of my invention is to provide an improved hydraulic brake actuating system that can be more easily controlled by the operator.

Other objects of my invention will become apparent from the following description taken in connection with the accompanying drawing in which the single figure is a schematic view of a braking system embodying my invention, the parts of the pressure control valve being shown in section.

Referring to the drawing in detail, numeral 1 indicates a master cylinder device of known construction comprising a cylinder 2 and a piston 3, said piston being actuated by a piston rod 4 and a pedal 5. The piston 3 is normally biased to an inoperative position by a spring 6 and in this position its packing cup uncovers a porthole 7 for placing the portion of the cylinder ahead of the piston in communication with the reservoir 8 above the cylinder. The outlet of the master cylinder device is connected to a conduit 9 which leads to my improved pressure control valve mechanism generally indicated by the letter "A." This valve mechanism A is in turn connected by a conduit 10 and branch conduits 11 to fluid motors 12 for operating any apparatus but shown as operating brake assemblies 13. My improved pressure control valve mechanism A is shown as being separate from the master cylinder 1 but it may, if desired, be incorporated in the same housing with the master cylinder. However, by having it separated it may be positioned at any point where space is readily available.

My improved pressure control valve mechanism is provided with a large cylinder 14 and a smaller cylinder 15, said cylinders being screwed together in axial alignment as shown. The outer end of cylinder 14 is connected to conduit 9 coming from the master cylinder device and the outer end of cylinder 15 is connected to conduit 10 leading to the brake assemblies. Within cylinder 14 is a piston 16 and within cylinder 15 is a piston 17, said pistons carrying packing cups 18 and 19, respectively. The piston 16 is provided with an integral cylindrical extension 20 which extends into cylinder 15 toward piston 17 and carries on its inner end a yieldable valve seat element 21, said cylindrical extension being of slightly less diameter than the cylinder 15. The extension 20 receives an extension 22 carried by piston 17, said extension being provided with a conduit 23. The valve element 21 is so formed as to also act as a seal between the extensions. The extensions are provided with abutting shoulders 24 and 25 to limit the extent of separation of pistons 16 and 17. When the shoulders are in abutment, the valve element 21 will be spaced from an annular valve seat 26 carried on the rear side of piston 17. This annular valve seat forms a chamber 27 surrounding the extension 22 and the chamber communicates with passage 23 through the extension by way of holes 28. Chamber 27 also communicates with the space between cylinder 15 and the extension 20 when the valve element 21 is unseated. This space communicates with a conduit 29 leading to the top of the reservoir 8 of the master cylinder device. The arrangement of pistons 16 and 17 and shoulders 24 and 25 of the extensions is such that when piston 17 is in abutment with the outer end of cylinder 15, piston 16 will be spaced sufficiently from the inner end of cylinder 14 so as to permit movement of piston 16 toward piston 17 to cause valve element 21 to be seated on the annular seat 26.

The end of extension 22 which lies within the cylindrical extension 20 has threaded thereon a cup-shaped element 30 provided with an opening 31 for permitting communication from cylinder 14 to passage 23. The opening is controlled by a check valve comprising a valve element 32 and a spring 33, said check valve permitting fluid to flow only from cylinder 14 to passage 23. Interposed between the cup-shaped element 30 and the outer end of the large cylinder 14 is a spring 34 of predetermined strength, said spring acting through the cup-shaped element and the extension 22 to bias piston 17 against the outer end of cylinder 15. The spring 33 for the check valve is only of such strength that it will maintain the valve element 32 seated until sufficient pressure is built up in cylinder 14 to move piston 16 to the left and cause the valve element 21 to be seated against the annular seat 26.

The ratio of the cross-sectional areas of the cylinders may be of any value desired but for purposes of explanation of the operation of the device, it is assumed that the ratio is two to one. When the brakes are in released condition the parts of the valve mechanism A and the master cylinder device will be in the positions shown. If it is now desired to apply the brakes, pedal 5 is operated, thereby causing piston 3 to move forwardly to close porthole 7 and then subsequently begin to build up pressure in cylinder 6 of the master cylinder device and transmit it to the fluid in cylinder 14 of the pressure control valve mechanism A. As pressure builds up in cylinder 14, piston 16 will be moved to the left from the position shown in the figure and to a position where the valve element 21 will be seated. Seating of this valve element will close off communication between conduit 29 leading to the reservoir and the brakes. As a slight additional pressure is built up in cylinder 14, valve element 32 will open and the fluid pressure being developed by the master cylinder will now be transmitted to fluid motors 12 of the brake assemblies to thereby apply the brakes with the desired braking pressure between the shoes and brake drums.

To obtain this desired braking pressure a predetermined force is necessary to be applied to the brake pedal. However, after the brakes have been applied with the desired pressure, it will not be necessary to maintain the same predetermined force on the brake pedal in order to maintain said desired braking pressure. The force acting on the brake pedal can be reduced to a value approximately one-half that of the force necessary to obtain the desired braking pressure, the extent of such reduction being determined by the ratio of the areas of pistons 16 and 17 assumed to be two to one. When the force acting on the brake pedal is reduced, the pressure of the fluid in the master cylinder device and cylinder 14 will also be reduced. However, there will be no reduction in the fluid pressure acting in the brake fluid motors 12 as long as the reduced pressure in cylinder 14 is above one-half the pressure in the motors because the check valve 32 will prevent fluid from flowing back from the brake fluid motors to cylinder 14. In other words, since pistons 16 and 17 now act as compound pistons without any possibility of flow of fluid back to the master cylinder device, it will only be necessary to maintain half the fluid pressure in cylinder 14 to prevent movement of piston 17 to the right and a decrease in the fluid pressure in the brake fluid motors.

If it should be desired to release some of the pressure which has been developed in the brake fluid motors, the force acting on the brake pedal may be additionally released so that the pressure in cylinder 14 is decreased below one-half of that placed in the fluid motors. When this occurs, the fluid pressure in the fluid motors will move the pistons 16 and 17 to the right and thus reduce the fluid pressure in the fluid motors.

When the brake pedal is fully released the pressure in cylinder 14 will drop to zero due to the fact that the porthole 7 of the master cylinder device is uncovered. Under these conditions the fluid pressure in chamber 27 will unseat valve element 21 and cause the relative positioning of pistons 16 and 17 as shown. Under these conditions the fluid motors of the brake assemblies will be in direct communication with reservoir 8 by way of conduit 29, thereby releasing the brakes.

The brakes will also be released whenever the fluid pressure in cylinder 14 is decreased to a point where the force exerted by spring 34 can over-ride the effective fluid pressure forces acting on piston 17 and holding valve seat 26 engaged with valve element 21. Thus it is seen that the brakes cannot be maintained applied under extremely low pressures by release of the pedal 5 to a position where piston 3 approaches the uncovering of porthole 7. In other words, due to spring 34, there will be a condition reached during simultaneous movement of pistons 17 and 16 to the right wherein the fluid pressure in cylinder 14 cannot be reduced further without releasing the brakes. This point of release is determined by spring 34. In practice it should preferably be where the brake shoes will just be held in firm contact with the drum.

It is to be particularly noted in connection with the operation of the valve mechanism just described that when the fluid pressure in the motors has been decreased, it may be restored to its original pressure by operation of the brake pedal. The force on the brake pedal necessary to restore said initial pressure in the fluid motors need only be half that required to place the initial pressure in the fluid motors. This is obvious from the fact that piston 16 is twice the area of piston 17 and the pistons act as compound pistons. However, if it is desired to increase the initial pressure which has been placed in the fluid motors, it will be necessary to apply a force to the brake pedal which is greater than the force required to place the initial pressure in the fluid motors since when this increase of the initial pressure is desired, the check valve element 32 must be reopened to inject additional fluid under pressure in the fluid motors. The pistons 16 and 17 cannot move to the left in order to develop any pressure greater than the initial pressure as piston 17 will abut against the closed outer end of cylinder 15 at the time that the initial pressure is restored.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure actuating system, a master cylinder device, an actuating fluid motor, conduit means between the master cylinder device and the motor, and means comprising a pressure transformer and by-pass means therefor associated with said conduit means for the establishing of a predetermined fluid pressure in the motor by operation of the master cylinder device, for the maintaining of said predetermined pressure in the motor when the master cylinder developed pressure is lowered to a value below that developed for the establishing of the predetermined pressure and for the varying of the motor fluid pressure below the predetermined pressure by the varying of the master cylinder developed fluid pressure below said lower value.

2. In a fluid pressure actuating system, a master cylinder device including a reservoir, an actuating fluid motor, conduit means between the master cylinder device and the motor, means comprising a pressure transformer and by-pass means therefor associated with said conduit means for the establishing of a predetermined fluid pressure in the motor by operation of the master cylinder device, for the maintaining of said predetermined pressure in the motor when the master cylinder developed pressure is lowered to a value below that developed for the establishing of the predetermined pressure and for the varying of the motor fluid pressure below the predetermined pressure when the master cylinder developed fluid pressure is varied below said lower value, and means for releasing the fluid pressure in the motor to the master cylinder reservoir when the pressure developed by the master cylinder is lowered to a predetermined minimum value.

3. In a fluid pressure actuating system, a master cylinder device, an actuating fluid motor, conduit means between the master cylinder device and the motor, and means comprising a pressure transformer and by-pass means therefor associated with said conduit means for the establishing of a predetermined fluid pressure in the motor by operation of the master cylinder device, for the maintaining of said predetermined pressure in the motor when the master cylinder developed pressure is lowered to a value below that developed for the establishing of the predetermined pressure and for the varying of the motor fluid pressure below the predetermined pressure when the master cylinder developed fluid pressure is varied below said lower value, said pressure transformer functioning in a manner to maintain a predetermined fixed relationship between the motor pressure and the master cylinder developed pressure when the former is varied by the varying of the latter below said lower value.

4. In a fluid pressure actuating system, a source of variable fluid pressure, a fluid motor for actuating a device, conduit means between the source and motor, and means comprising a pressure transformer and by-pass means therefor associated with the conduit means for the establishing of a predetermined pressure in the motor by a similar pressure transmitted from the source, for the maintaining of said predetermined pressure when the pressure from the source is reduced to a lower value and for the subsequent reducing and reestablishing of said predetermined pressure by a reducing of the fluid pressure from the source below said lower pressure and then a re-establishing of said lower pressure.

5. In a fluid pressure actuating system, a source of variable fluid pressure, a fluid motor for actuating a device, conduit means between the source and motor, means for trapping fluid under pressure in the fluid motor at substantially the same value as transmitted from the source, and means comprising a pressure transformer operable during a reduction of the fluid pressure from the source to a predetermined value for maintaining the fluid pressure effective as trapped in the motor and operable by a further reduction of the fluid pressure from the source below said predetermined value and then a reestablishment of said predetermined value for causing a reduction and re-establishment of the fluid pressure trapped in the motor.

6. In a fluid pressure actuating system, a source of variable fluid pressure, an actuating fluid motor, conduit means between the source and the motor, and means associated with said conduit means for the establishing by fluid pressure from the source of a predetermined fluid pressure in the motor when a similar pressure is transmitted from the source, for the maintaining of said predetermined pressure in the motor when the fluid pressure from the source is reduced to a lower value and for the varying of the motor fluid pressure below the predetermined pressure when the fluid pressure from the source is varied below said lower value, said means comprising two axially aligned pistons of different diameters with the larger acted upon by the pressure from the source and the smaller acted upon by the fluid pressure effective in the motor and functioning to trannsmit force only when the fluid pressure from the source is varied below said lower value pressure.

7. In a fluid pressure actuating system, a source of variable fluid pressure, an actuating fluid motor, conduit means between the source and the motor, and means associated with said conduit means for the establishing by fluid pressure from the source of a predetermined fluid pressure in the motor when a similar pressure is transmitted from the source, for the maintaining of said predetermined pressure in the motor when the fluid pressure from the source is reduced to a lower value and for the varying of the motor fluid pressure below the predetermined pressure when the fluid pressure from the source is varied below said lower value, said means comprising two axially aligned pistons of different diameters with the larger acted upon by the pressure from the source and the smaller acted upon by the fluid pressure effective in the motor and by-pass means for the pistons permitting fluid pressure to be transmitted only from the source to the motor, said pistons functioning to transmit force only when the fluid pressure from the source is varied below said lower value pressure.

8. In a fluid pressure actuating system, a master cylinder device having a reservoir, an actuating fluid motor, conduit means between the master cylinder device and the motor, two pistons of different sizes associated with the conduit means, the smaller of whch is subject to the fluid pressure in the motor and the larger of which is subject to fluid pressure developed by the master cylinder device, means for limiting the movement of the pistons in a direction toward the fluid motor, a by-pass associated with the pistons, a check valve for said by-pass permitting flow of fluid only from the master cylinder device to the motor, and means comprising valve means permitting flow of fluid from the motor to the reservoir when the fluid pressure developed by the master cylinder device is below a predetermined minimum.

9. In a fluid pressure actuating system, a master cylinder device including a reservoir, an actuating fluid motor, conduit means between the master cylinder device and the motor, means comprising a pair of relatively movable axially aligned pistons of different diameters associated with said conduit means with the larger being subject to the fluid pressure developed by the master cylinder device and the smaller subject to the fluid pressure effective in the motor, means for limiting the movement of the smaller piston in the direction of movement of the larger piston under the action of fluid pressure from the master cylinder, a spring for normally biasing the smaller piston to said limited position, means comprising valve means controlled by the relative movement of said pistons for connecting the fluid motor to the master cylinder reservoir, a by-pass for said pistons, and a normally closed check valve for said by-pass for permitting flow of fluid only from the master cylinder device to the fluid motor.

10. In a fluid pressure actuating system, a master cylinder device including a reservoir, an actuating fluid motor, conduit means between the master cylinder device and the motor, means comprising a pair of relatively movable axially aligned pistons of different diameters associated with said conduit means with the larger being subject to the fluid pressure developed by the master cylinder device and the smaller subject to the fluid pressure effective in the motor, means for limiting the movement of the smaller piston in the direction of movement of the larger piston under the action of fluid pressure from the master cylinder, a spring for normally biasing the smaller piston to said limited position, means comprising valve means controlled by the relative movement of said pistons for connecting the fluid motor to the master cylinder reservoir, means establishing a passage through said pistons, and a normally closed check valve for said by-pass for permitting flow of fluid only from the master cylinder device to the fluid motor.

11. In a fluid pressure actuating system, a master cylinder device including a reservoir, an actuating fluid motor, axially aligned cylinders, conduit means for connecting the outer end of the larger cylinder to the master cylinder device, conduit means for connecting the outer end of the smaller cylinder to the fluid motor, pistons in said cylinders, means for biasing the smaller piston toward the outer end of its cylinder, means for connecting the pistons together for simultaneous movement and including means permitting slight relative movement between the pistons, conduit means through the pistons, means for connetcing the space between the pistons to the master cylinder reservoir, valve means for controlling communication between the passage through the pistons and said chamber, and a one-way valve for said passage for permitting flow of fluid only from the master cylinder device to the motor.

STEVE SCHNELL.